United States Patent [19]

Antill et al.

[11] Patent Number: 5,063,707
[45] Date of Patent: Nov. 12, 1991

[54] AGRICULTURAL SHEET LIFTER

[75] Inventors: David N. Antill, New Milton; Harold G. Mustey, Lymington, both of England

[73] Assignee: The Minister of Agriculture, Fisheries and Food in Her Britannic Majesty's Government of the United Kingdom of Great Britain and Northern Ireland, London, England

[21] Appl. No.: 503,421

[22] Filed: Mar. 20, 1990

[30] Foreign Application Priority Data

Jul. 20, 1987 [GB] United Kingdom ................ 8717114

[51] Int. Cl.⁵ .............................................. A01G 7/00
[52] U.S. Cl. ......................................................... 47/9
[58] Field of Search ..................................... 47/9, 9 M

[56] References Cited

U.S. PATENT DOCUMENTS

| 3,181,455 | 5/1965 | Gouker | 47/9 M |
| 3,353,297 | 11/1967 | Gervais | 47/9 M |
| 3,559,599 | 2/1971 | Hoadley | 47/9 M |
| 3,701,241 | 10/1972 | Zuckerman | 56/327 |
| 4,796,711 | 1/1989 | Chrysler | 47/9 M |

FOREIGN PATENT DOCUMENTS

| 2399796 | 9/1977 | France | 47/9 M |
| 2562382 | 8/1985 | France | 47/9 M |

Primary Examiner—Henry E. Raduazo
Attorney, Agent, or Firm—Nixon & Vanderhye

[57] ABSTRACT

The present invention related to an agricultural sheet lifting device having a frame mounted on wheels and means for attaching agricultural machinery thereto. The device includes a means for lifting buried edges of an agricultural sheet, means for guiding the sheet over the agricultural machinery and means for reburying edges of the agricultural sheet.

14 Claims, 2 Drawing Sheets

AGRICULTURAL SHEET LIFTER

This application is filed under 35USC363 and is related to international application No. PCT/GB88/00588, filed July 20, 1988.

BACKGROUND OF THE INVENTION

1. Field of the Invention

The present invention relates to machinery for handling agricultural sheets of the type used for covering soil.

2. Discussion of Prior Art

The type of sheets with which the invention is concerned include, for example, solid or perforated polyethlene film or woven sheets; that is, any sort of sheet which can be comparatively easy maneuvered without suffering excessive damage.

Sheeting of this type is used for various agricultural purposes. For example sheets can be used to cover newly planted seeds and crops in the early stages of growth to protect them from adverse weather conditions. It is also common practice to lay sheets of this type of material over prepared fields in, for example, October to retain heat in the soil prior to the planting of crops in, for example, February.

Sheets are usually layed in strips of about 1.5 meters in width with an adequate spacing between adjacent strips for the accommodation of tractor wheels. The edges of the sheets are buried in the earth to anchor the sheets, and there are many machines known for carrying out the function of laying sheets and burying the edges. However it is frequently necessary to carry out action underneath the sheets: for example to drill seeds in February under sheets laid in October, and to apply fertiliser, insecticide and the like to crops at a stage where it is still desirable to have the crops covered. This involves either raising the sheets, or perforating the sheets, which inevitably results in some loss of effectiveness thereof.

There therefore exists a need for some means of raising sheets, carrying out a function on crops beneath the sheets, and then relaying the sheets.

SUMMARY OF THE INVENTION

According to the present invention an agricultural sheet lifting device has a frame mounted on wheels and means for attaching thereto agricultural machinery characterised in including means for lifting buried edges of an agricultural sheet, means for guiding the sheet over the agricultural machinery, and means for repositioning and reburying the edges.

The type of agricultural machinery intended to be carried includes, for example, seeding machinery and fertiliser or insecticide spraying machinery.

The means for lifting the buried edges may include, for example, tines, shares, or rotary discs, which may be powered or unpowered, adapted to travel at a sufficient depth below ground level to raise the edges without damaging a sheet.

The means for guiding the sheet over the agricultural machinery may include a lifting plough preferably having curved surfaces, which may advantageously have a free-rolling or a powered nose roller. Alternatively a series of powered or free rolling rollers may be used.

The means for repositioning and reburying the edges preferably includes a free running or a powered tension roller.

BRIEF DESCRIPTION OF THE DRAWINGS

One embodiment of the invention will now be described, by way of example only, with reference to the accompanying diagrammatic drawings, of which.

DETAILED DISCUSSION OF PREFERRED EMBODIMENTS

Figure 1:
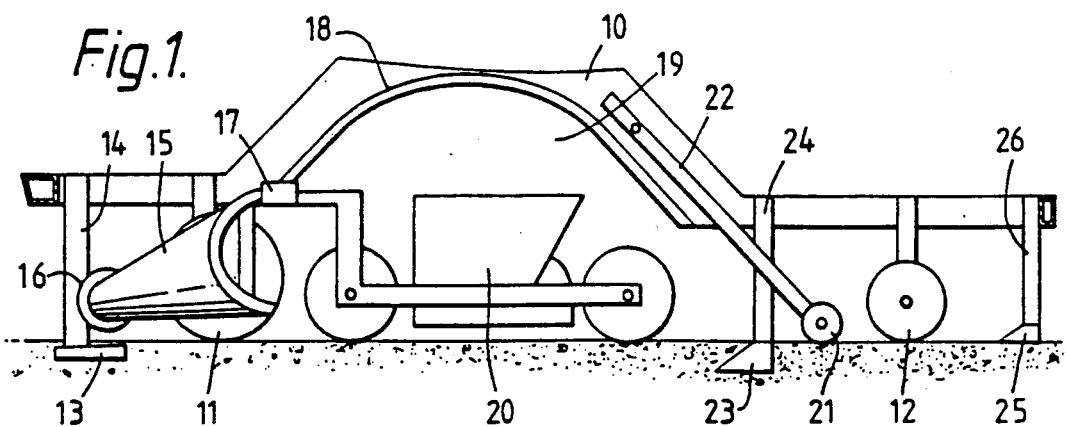
FIG. 1 is an elevation, in section along line A—A of FIG. 2, of a device according to the invention.
Figure 2:
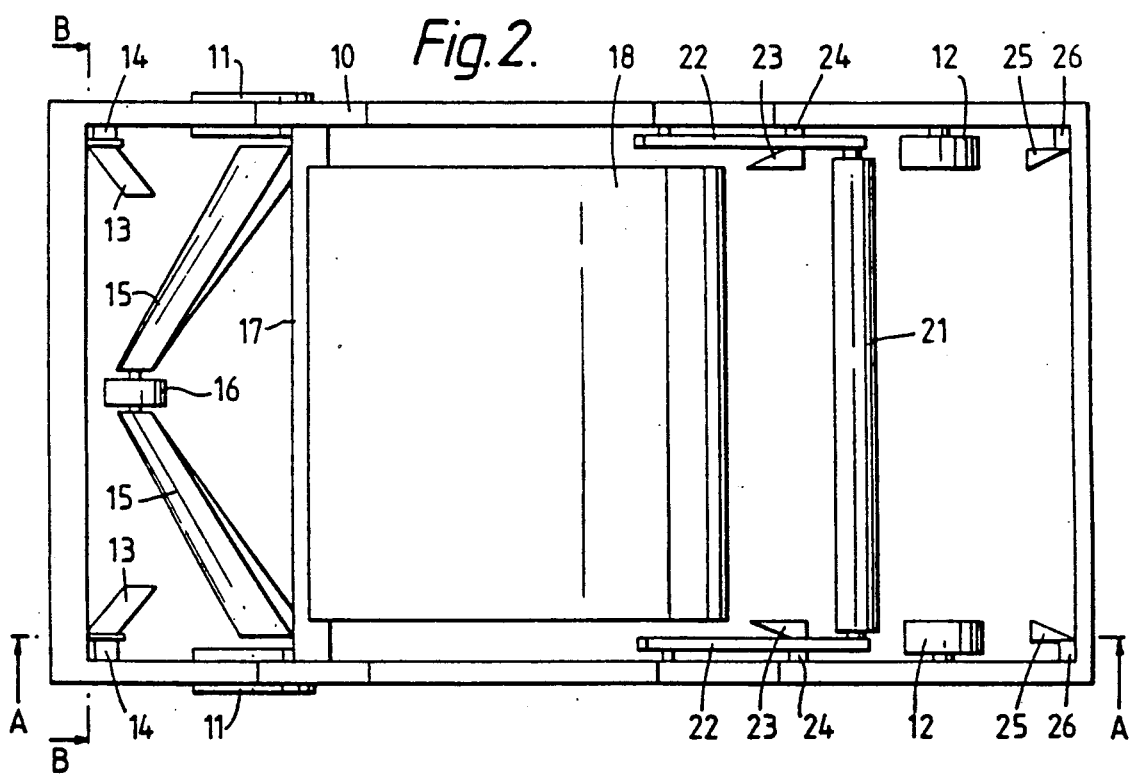
FIG. 2 is a plan view of the device.
Figure 3:
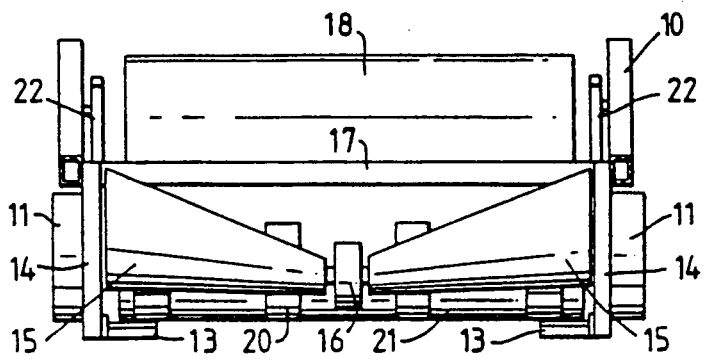
FIG. 3 is a front elevation, along line B—B of FIG. 2, of the device.

A sheet lifting device (FIGS. 1 to 3) has a frame 10 mounted on front wheels 11 and rear wheels 12. At each side of the frame 10, extending inwardly thereof and forward of the wheels 11 are a pair of edge lifting tines 13 secured to mountings 14 at a level lower than the plane defined by a running surface of wheels 11, 12. Also mounted on the frame 10 are 2 curved plough members 15, each mounted at a position adjacent the level of the wheels 11 and extending inwardly and forwardly to a central position, in substantial alignment with the tines 13, where they mutually support a nose roller 16. Secured to the frame 10 aft of the wheels 11 is an equipment mounting bar 17 from which extends a curved bridge member 18 beneath which is defined a volume 19 in which can travel agricultural machinery, such as that shown at 20, also secured to the equipment mounting bar 17.

Rear of the bridge member 18 is a tension roller 21 mounted on a pivoted frame 22. Reburying furrow openers 23 secured to mountings 24 are positioned at a depth similar to that of the tines 13, and reburying furrow closers 25 secured to mounting 26 are positioned at the plane define by the running surface of the wheels 11, 12 and rearward of the wheels 12.

Figure 4:
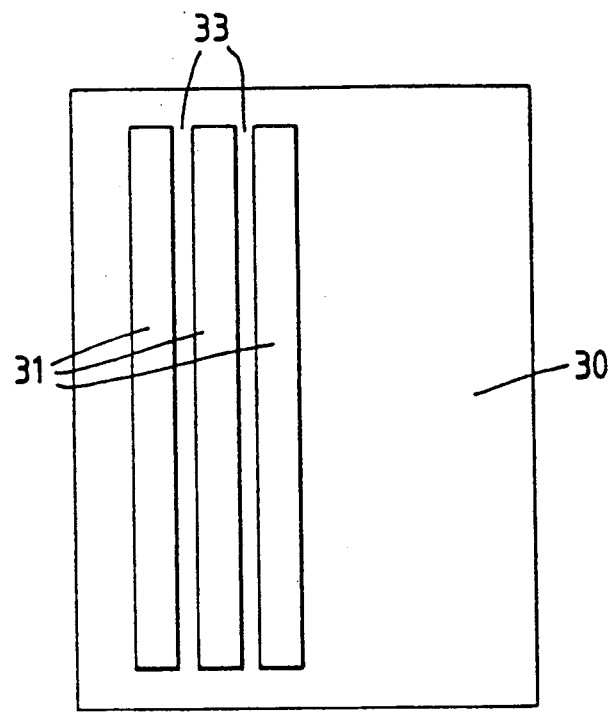
FIG. 4 is a plan view of a field containing sheets to be lifted by the device.
Figure 5:
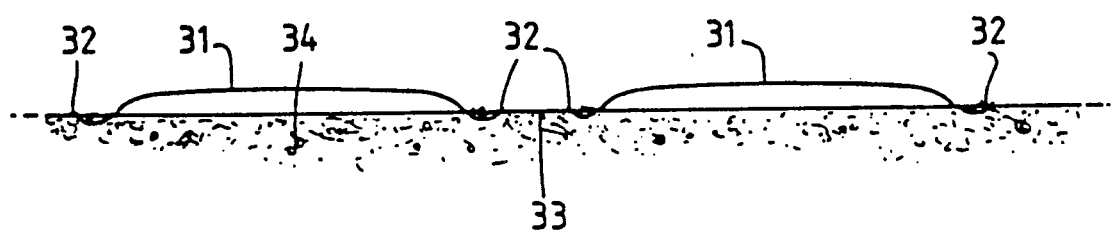
FIG. 5 is a detail of a sectional elevation of the field surface.

In use the device is used in a field (FIG. 4, FIG. 5) 30 in which have been layed a plurality of sheets 31 each with edges 32 buried into earth 34 and with a space 33 between adjacent sheets 13. The machine is drawn by a tractor (not shown), which passes with its wheels along the spaces 33, as do front wheels 11 of the device. An end of the sheet is manually manoeuvred on to the plough defined by members 15 and roller 16, and then the device is drawn along the length of the sheet 31. The edge lifting tines 13 slide below the edges 32 of the sheet, releasing them and allowing the sheet to be lifted by the plough 15, and roller 16 on to the bridge 18, over the bridge 18 back to the earth to overlie new furrows created by reburying furrow openers 23. The sheet 31 is pressed onto the surface of the earth by the tension roller 21. The width between the rear wheels 12 is preferably such that they run over the edges 32 of the sheet 31 pressing them into the furrows which are then closed by the furrow closers 25.

Whilst the sheet 31 is clear of the earth 34 appropriate agricultural machinery 20 attached to the equipment mounting bar 17 carries out an agricultural process such as seeding, fertilising or spraying with insecticide.

It will be realised that very many alternative embodiments of the above described device are possible within the scope of the invention. For example, whilst sheets 31 are commercially produced in standard widths it may be advantageous to have the width of the wheels 11, wheels 12 or both adjustable to allow for some variation in width of sheets 31. It may also be advisable to have the heights of edge lifting tines 13, reburrowing furrow openers 23, and reburrowing furrow closers 25 relative to the plane of the running surface of wheels 11, 12 adjustable, to allow for variations in depth of burying of edges 32 of sheets 31, or to allow the device to be towed along surfaces without these items penetrating or contacting the surface. This may be achieved by making the lengths of mounting 14, 24 and 26 adjustable, or by making the wheel 11, 12 mountings of adjustable height.

Also many items described above, shown as free acting, may be replaced by powered versions: for example the nose roller 16 and tension roller 21. The tension roller 21, shown as freely mounted, may also be forced into greater pressure of contact with the sheet 31 and underlying earth 34 by, for example, hydraulic or pneumatic means which may be supplied from the tractor (not shown) used in conjunction with the device.

Likewise the tines 13 may be replaced by, for example, shares or rotary discs which may be power driven, the plough 15, 16 may be replaced by a plurality of rollers which may be powered or free rolling, and the bridge member 18 may comprise powered or free rolling rollers.

It will be realised that the structure of the reburying furrow openers 23, reburying furrow closers 25 and rear wheels 12 when used to press the edges 32 into the earth 34 are common with conventional sheet laying machinery, and also that the device is designed to operate with conventional agricultural seeding, and the like, machinery as indicated at 20.

What is claimed is:

1. An agricultural sheet lifting device for lifting buried edges of an agricultural sheet, said device including a frame mounted on wheels and means for conveying agricultural machinery, said device further comprising: means for lifting said buried edges, means for guiding the sheet over the agricultural machinery and means for repositioning and reburying said edges.

2. A device as claimed in claim 1 characterised in that the means for lifting the buried edges include tines.

3. A device as claimed in claim 1 characterised in that means for guiding the sheet includes a lifting plough.

4. A device as claimed in claim 1 characterised in that the device for guiding the sheet includes a bridge member.

5. A device as claimed in claim 1 characterised in that the means for repositioning and reburying edges includes a tension roller.

6. A device as claimed in claim 5 characterised in that tension roller (21) is powered.

7. An agricultural sheet lifting device as claimed in claim 1 characterised in that rear wheels are adapted to run over the edges said after repositioning and before reburying.

8. An agricultural sheet lifting device for lifting buried edges of an agricultural sheet, said device comprising:
a frame;
wheels located in conjunction with said frame;
means for conveying associated agricultural machinery;
means for lifting said buried edges;
means for guiding said sheet over said agricultural machinery; and
means for repositioning and reburying said edges.

9. A sheet lifting device in accordance with claim 8, wherein said means for lifting comprises tines.

10. A sheet lifting device in accordance with claim 8, wherein said means for guiding said sheet comprises a curved plough.

11. A sheet lifting device in accordance with claim 8, wherein said means for guiding comprises a bridge member.

12. A sheet lifting device in accordance with claim 8, wherein said means for repositioning and reburying said edges comprises a tension roller.

13. A sheet lifting device in accordance with claim 8, wherein said means for repositioning and reburying said edges comprises reburying furrow closers.

14. A sheet lifting device in accordance with claim 8, wherein at least some of said wheels are located within said means for repositioning and reburying said edges, after said repositioning and before said reburying.

* * * * *